United States Patent
Wu

(10) Patent No.: US 7,474,146 B2
(45) Date of Patent: Jan. 6, 2009

(54) ELECTRONIC DEVICE WITH STANDBY FUNCTION, STANDBY POWER SUPPLY SYSTEM AND METHOD THEREOF

(75) Inventor: Chin-Hsiang Wu, Taipei County (TW)

(73) Assignee: Qisda Corporation, Taoyuan County (TW)

( * ) Notice: Subject to any disclaimer, the term of this patent is extended or adjusted under 35 U.S.C. 154(b) by 53 days.

(21) Appl. No.: 11/798,990

(22) Filed: May 18, 2007

(65) Prior Publication Data

US 2007/0279951 A1 Dec. 6, 2007

(30) Foreign Application Priority Data

May 18, 2006 (TW) .................................. 95117720

(51) Int. Cl.
*G05F 1/10* (2006.01)
(52) U.S. Cl. ....................................... 327/544; 365/227
(58) Field of Classification Search ................. 327/142, 327/143, 544; 365/226–227; 363/76
See application file for complete search history.

(56) References Cited

U.S. PATENT DOCUMENTS 6,642,757 B2 * 11/2003 Ikehashi et al. ............. 327/142
7,286,435 B2 * 10/2007 Odate et al. ................. 365/227

* cited by examiner

*Primary Examiner*—Long Nguyen

(57) ABSTRACT

A standby power supply system in an electronic device including a power-consuming circuit is provided. The standby power supply comprises a signal sensor, a standby power source, a switch circuit, a charge circuit and a power control unit. The signal sensor receives a system-on signal and generates a charging signal and a power-on signal according to the system-on signal. The standby power source provides a first voltage that the signal sensor needs in a standby status. The switch circuit receives the charging signal and then is conducted for a predetermined period. When the switch circuit is conducted and the charge circuit proceeds to charge to a predetermined voltage, the charge circuit turns on the power control unit to receive the power-on signal. The power control unit turns on the operation power supply according to the power-on signal, such that the operation power supply provides an operating voltage to the power-consuming circuit.

13 Claims, 5 Drawing Sheets

ELECTRONIC DEVICE WITH STANDBY FUNCTION, STANDBY POWER SUPPLY SYSTEM AND METHOD THEREOF

This application claims the benefit of Taiwan application Serial No. 95117720, filed May 18, 2006, the subject matter of which is incorporated herein by reference.

BACKGROUND OF THE INVENTION

1. Field of the Invention

The invention relates in general to an electronic device with standby function, standby power supply system and method thereof, and more particularly to an electronic device with standby function, which can save standby power, standby power supply system and method thereof.

2. Description of the Related Art

Referring to FIG. 1A, a block diagram of a conventional electronic device with standby function is shown. An electronic device 100, a consuming electronic product such as a liquid-crystal TV, projector, or computer monitor, includes a standby power supply system 110, a relay 120 and a power load 130. The standby power supply system 110 includes a standby power transformer 112, signal sensor 114, power control unit 116 and control unit 118. Under a standby mode, the standby power transformer 112 receives an alternating-current (AC) voltage AC and transforms the voltage AC into a first direct-current (DC) voltage $V_{CC1}$ and a second DC voltage $V_{CC2}$. The first DC voltage $V_{CC1}$ is supplied to the signal sensor 114 for maintaining its normal operation and the second DC voltage $V_{CC2}$ is supplied to the power control unit 116 for maintaining its normal operation. The signal sensor 114 receives a system power-on signal S1 from a remote controller 10 and accordingly generates and outputs a control signal S2 to the power control unit 116. The power control unit 116 outputs an actuation signal S3 to the control unit 118 according to the control signal S2.

Referring to FIG. 1B, a circuit diagram of a control unit of a conventional standby power supply system is shown. The control unit 118 includes a capacitor 181 and a NPN-type bipolar junction transistor (BJT) 182. The capacitor 181 is charged by receiving the system power-on signal S3. The NPN-type BJT 182 is used as a switch. When the capacitor 181 is finished charged, the NPN-type BJT 182 is turned on and outputs a control current $I_C$ to the relay 120 for turning on the relay 120. The power supply unit 122 receives the AC voltage AC according to the turned-on relay 120, transforms the AC voltage AC into the required operational voltage $V_{CC}$ of the electronic device 100 and supplies the operational voltage $V_{CC}$ to the power load 130 as shown in FIG. 1A. However, the standby power supply system 110 has a low efficiency of power supply and consumes much standby power even under a low loading situation.

SUMMARY OF THE INVENTION

The invention is directed to an electronic device with standby function, standby power supply system and method thereof. The power consumed can be effectively reduced in a standby mode of the electronic device to meet the requirement of low power consumption of the electronic device with standby function.

According to a first aspect of the present invention, a standby power supply system is provided. The standby power system is applied to an electronic device including a power supply and a power load. The standby power supply system includes a signal sensor, standby power source, switch circuit, charging circuit, and power control unit. The signal sensor is for receiving a system power-on signal inputted by a user, and accordingly generating a charging signal and a power actuation signal. The standby power source is coupled to the signal sensor for supplying power to the signal sensor. The switch circuit is coupled to the standby power source and the signal sensor for receiving the charging signal and accordingly turning on the switch circuit for a period of preset charge time. The charging circuit is coupled to the switch circuit, wherein when the switch circuit is turned on, the standby power source charges the charging circuit. The power control unit is coupled to the charging circuit and the signal sensor. When the charging circuit is charged to a preset voltage, the charging circuit actuates the power control unit to receive the power actuation signal and accordingly actuate the power supply such that the power supply can supply an operational voltage to the power load. The preset charge time is at least enough for the standby power source to charge the charging circuit to the preset voltage.

According to a second aspect of the present invention, an electronic device with standby function is provided. The electronic device comprises a power load, a power supply and a standby power supply system. The power supply is coupled to the power load. The standby power supply system includes a signal sensor, standby power source, switch circuit, charging circuit, and power control unit. The signal sensor is for receiving a system power-on signal inputted by a user, and accordingly generating a charging signal and a power actuation signal. The standby power source is coupled to the signal sensor for supplying power to the signal sensor. The switch circuit is coupled to the standby power source and the signal sensor for receiving the charging signal and accordingly turning on the switch circuit for a period of preset charge time. The charging circuit is coupled to the switch circuit. When the switch circuit is turned on, the standby power source charges the charging circuit. The power control unit is coupled to the charging circuit and the signal sensor. When the charging circuit is charged to a preset voltage, the charging circuit actuates the power control unit to receive the power actuation signal and accordingly actuate the power supply such that the power supply can supply an operational voltage to the power load. The preset charge time is at least enough for the standby power source to charge the charging circuit to the preset voltage.

According to a third aspect of the present invention, a method for supplying power to actuate an electronic device is provided. The electronic device comprises a signal sensor, a standby power source, a switch circuit coupled to the standby power source and the signal sensor, a charging circuit coupled to the switch circuit, a power control unit coupled to the charging circuit and the signal sensor, a power supply and a power load. The method comprises receiving a system power-on signal inputted by a user by using the signal sensor and accordingly generating a charging signal and a power actuation signal; receiving the charging signal by using the switch circuit and accordingly turning on the switch circuit for a period of preset charge time such that the standby power source can charge the charging circuit; when the charging circuit is charged to a preset voltage, actuating the power control unit by using the charging circuit; and receiving the power actuation signal by using the power control unit and accordingly actuating the power supply such that the power supply can supply an operational voltage to the power load, wherein the preset charge time is at least enough for the standby power source to charge the charging circuit to the preset voltage.

The invention will become apparent from the following detailed description of the preferred but non-limiting embodiments. The following description is made with reference to the accompanying drawings.

DETAILED DESCRIPTION OF THE INVENTION

Figure 1A:
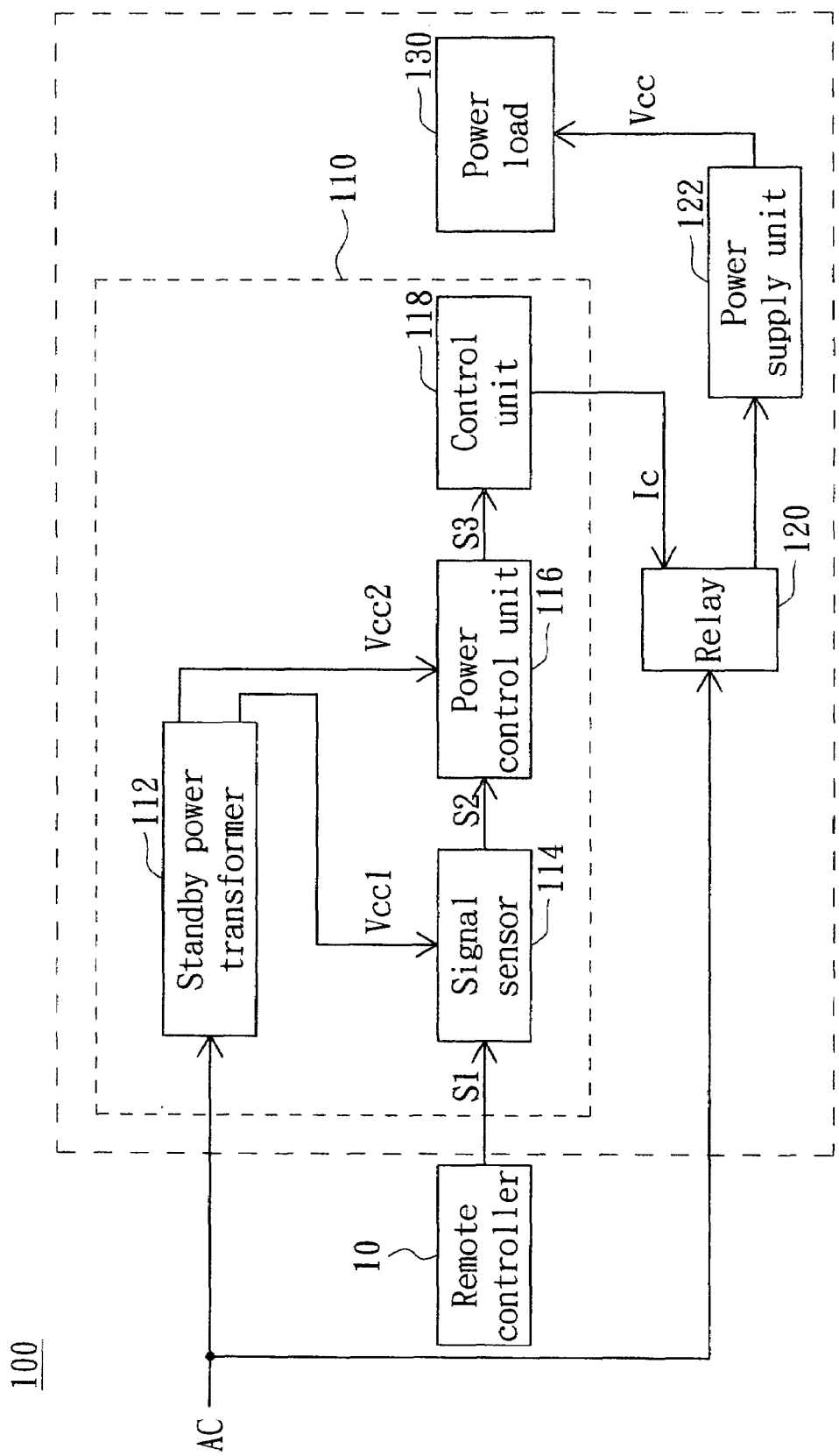
FIG. 1A is a block diagram of a conventional electronic device with standby function.
Figure 1B:
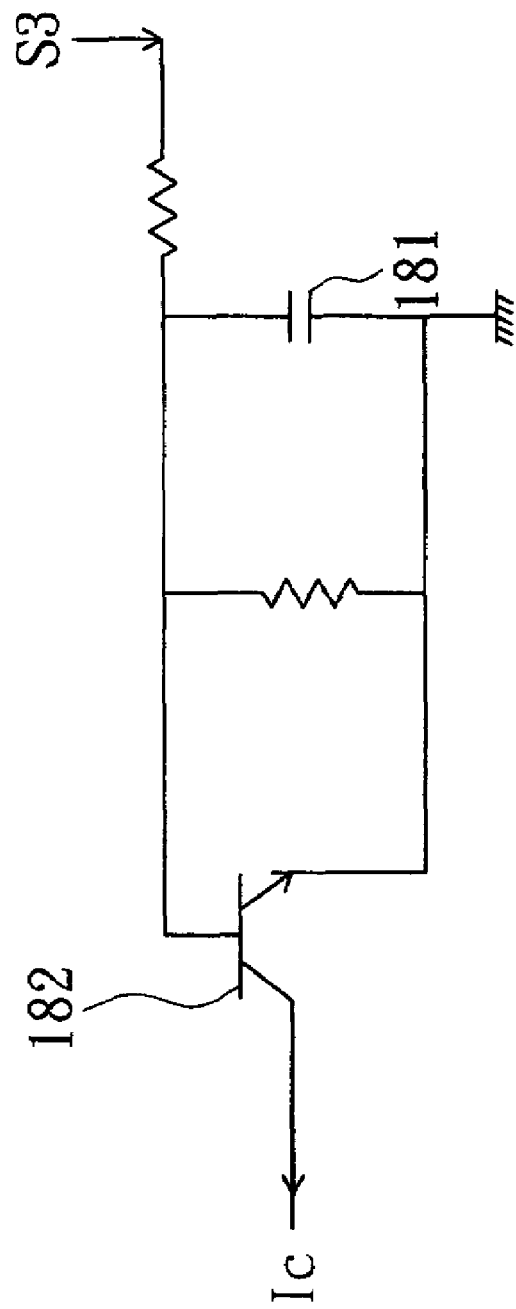
FIG. 1B is a circuit diagram of a control unit of a conventional standby power supply system.
Figure 2A:
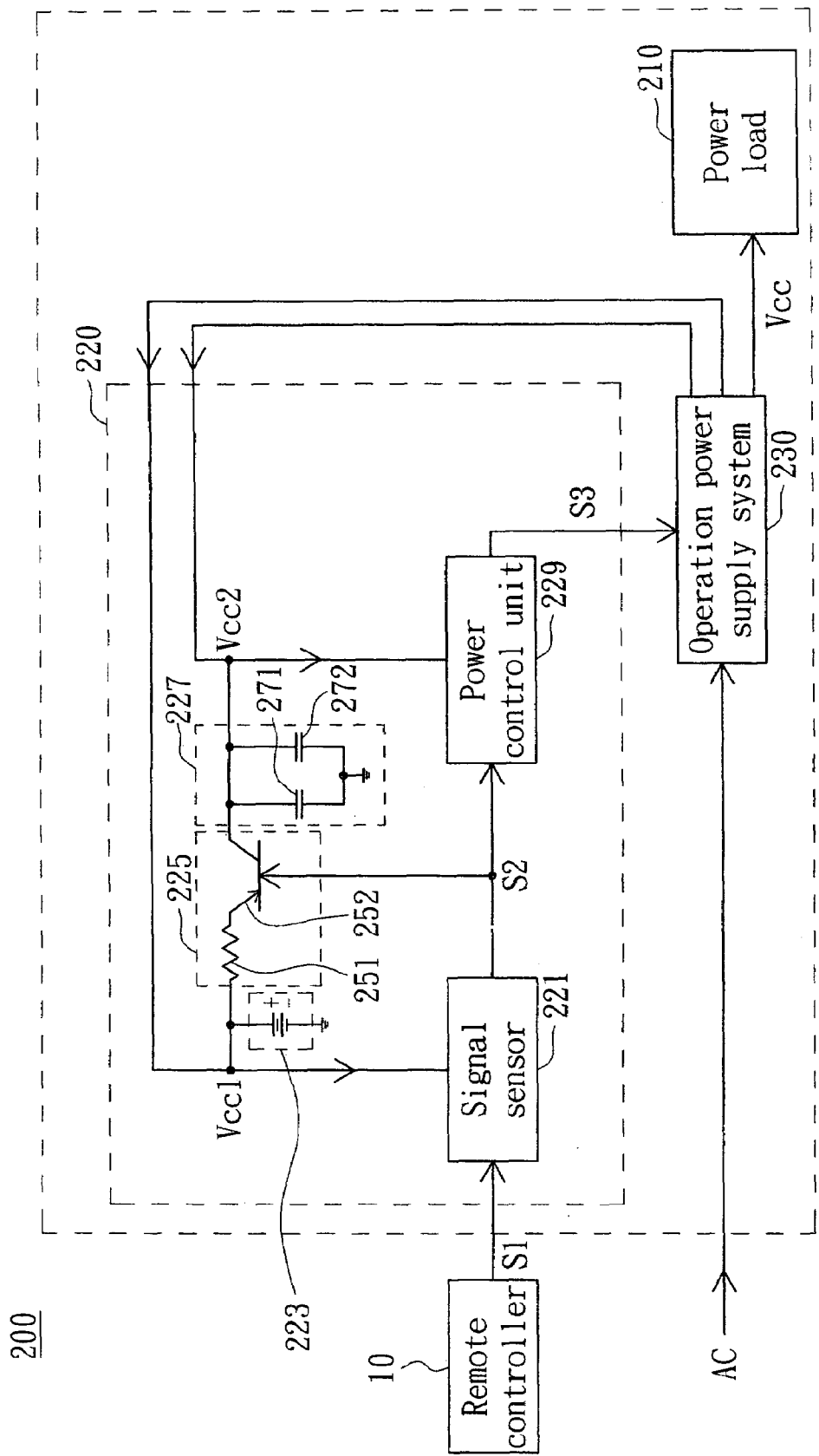
FIG. 2A is a block diagram of an electronic device with standby function according to a preferred embodiment of the invention.

Referring to FIG. 2A, a block diagram of an electronic device with standby function according to a preferred embodiment of the invention is shown. An electronic device 200, a consumer electronic product such as a liquid-crystal TV, projector or computer monitor, includes a power load 210, a standby power supply system 220, and an operation power supply system 230. The power load 210 represents the necessary electrical power consumption to maintain the electronic device 200 in operation. The standby power supply system 220 is for supplying the necessary electrical energy to maintain the electronic device 200 in a standby mode and capable to enter the operation mode from the standby mode. The standby power supply system 220 includes a signal sensor 221, a standby power source 223, a switch circuit 225, a charging circuit 227 and a power control unit 229. Preferably, the signal sensor 221 of the embodiment is a TSOP 4838 infrared-ray sensor made by Vishay, and the power control unit 229 is an 8051 microprocessor made by Myson Century Inc. http://www.myson.com.tw/.

Figure 2B:
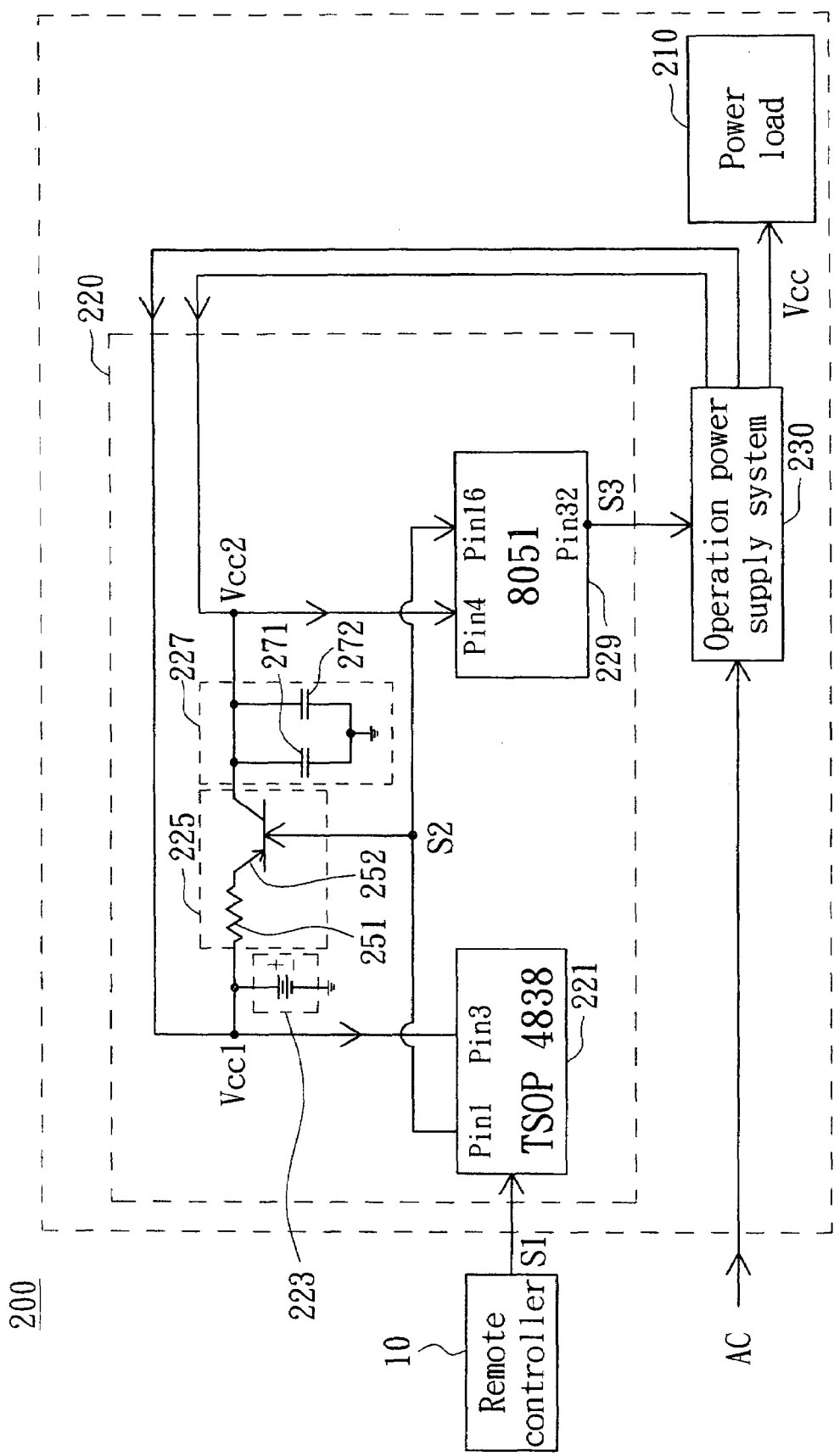
FIG. 2B is a circuit diagram of an electronic device with standby function according to the preferred embodiment of the invention.

Referring to FIG. 2B, a schematic circuit diagram of an electronic device with standby function according to the preferred embodiment of the invention is shown. The signal sensor 221 receives a system power-on signal S1 outputted from the remote controller 10 and accordingly generates the control signal S2. The control signal S2 includes a charging signal S21 and a power actuation signal S22. The standby power source 223 is coupled to the signal sensor 221 for supplying a first voltage $V_{CC1}$ (such as 5V) to maintain the signal sensor 221 operated when the electronic device 200 is in the standby mode. The switch circuit 225 is disposed between the standby power source 223 and the charging circuit 227. In response to the charging signal S21 received by the signal sensor 221, the corresponding control signal S2 turns on the switch circuit 225, so the switch circuit 225 couples the standby power source 223 to the charging circuit 227. The charging circuit 227 is coupled between the switch circuit 225 and the power control unit 229. When the switch circuit 225 is turned on, the standby power source 223 charges the charging circuit 227. When the charging circuit 227 is continuously charged to increase its voltage up to a second voltage $V_{CC2}$, the charging circuit 227 actuates the power control unit 229. At the time, the power control unit 229 can operate normally to receive the control signal S2 which comprises the power actuation signal S22.

When receiving the power actuation signal S22, the power control unit 229 outputs a power supplying signal S3 for actuating the operation power supply system 230 to supply the operational voltage $V_{CC}$ to the power load 210. When the operation power supply system 230 receives the power supplying signal S3 from the power control unit 229 (such as a Pin 32 of the 8051 circuit), the operation power supply system 230 transforms the electrical power from an external source, such as an AC voltage source, into the operational voltage $V_{CC}$ for the power load 210. After the electronic device 200 entering the operation mode, the operation power supply system 230 can also replace the standby power source 223 to supply the first voltage $V_{CC1}$ and the second voltage $V_{CC2}$.

Figure 3:
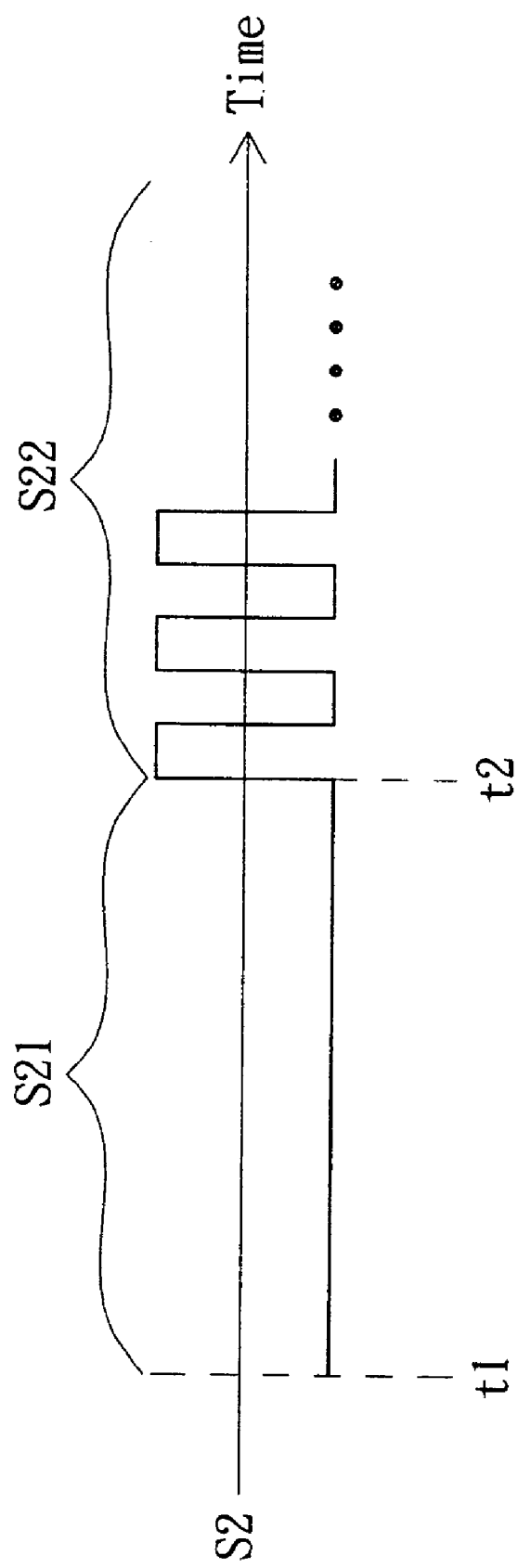
FIG. 3 is a timing diagram of a control signal according to the preferred embodiment of the invention.

Referring to FIG. 3, a timing diagram of a control signal according to the preferred embodiment of the invention is shown. The switch circuit 225 includes a resistor 251 and a PNP-type BJT 252. The charging circuit 227 includes two capacitors 271 and 272. When the electronic device 200 is under the standby mode, the signal sensor 221 receives the system power-on signal S1 and accordingly generates the control signal S2 including the charging signal S21 and the power actuation signal S22. Preferably, the charging signal S21 and the power actuation signal S22 are generated successively. In details, if the signal sensor 221 receives the system power-on signal S1 outputted by the remote controller 10 at the time t1, within a time duration between t1 and t2, the signal sensor 221 outputs the charging signal S21 with a low voltage level for instance for turning on the PNP-type BJT 252 of the switch circuit 225. When the PNP-type BJT 252 is turned on, the standby power source 223 can charge the charging circuit 227, such as the capacitors 271 and 272.

Afterwards, at the time t2, the control signal S2 generates the power actuation signal S22 which includes a high voltage level and a digital encoded signal in sequence. When the power actuation signal S22 is the high voltage level, the PNP-type BJT 252 of the switch circuit 225 is turned off as receiving the power actuation signal S22 with the high voltage level. The charging circuit 227 provides the stored second voltage $V_{CC2}$ to the power control unit 229 as an operational voltage. When the power control unit 229 receives the second voltage $V_{CC2}$ and the power actuation signal S22 outputted by the signal sensor 221, the power control unit 229 outputs the power supplying signal S3 to the operation power supply system 230 for actuating the operation power supply system 230 to supply the required operational voltage $V_{CC}$ of the power load 210 by transforming an external AC voltage AC. At the time, the electronic device 200 enters the operation mode from the standby mode.

Preferably, after the electronic device 200 enters the operation mode from the standby mode, the first voltage $V_{CC1}$ required by the signal sensor 221 and the second voltage $V_{CC2}$ required by the power control unit 229 can be supplied by the operation power supply system 230 in stead. That is, the operation power supply system 230 supplies the first voltage $V_{CC1}$ and the second voltage $V_{CC2}$ instead of the standby power source 223 and the charging circuit 227 so as to maintain a normal operation of the signal sensor 221, the switch circuit 225 and the power control unit 229. Besides, charging the standby power source 223 by the operational voltage $V_{CC}$ can elongate the life time of the standby power source 223. Therefore, the first voltage $V_{CC1}$ outputted by the standby power source 223 and the second voltage $V_{CC2}$ outputted by the charging circuit 227 needs only to maintain the short period between the input of system power-on signal S1 and the actuation of the operation power supply system 230.

The electronic device with standby function disclosed by the above embodiment of the invention can effectively reduce standby power consumption of the standby power supply system. When the electronic device 200 is set in the standby mode, it needs only to supply the first voltage $V_{CC1}$ (=5V) to the signal sensor 221 from the standby power source 223. Compared to the conventional electronic device which has to supply power to the loading devices such as the signal sensor, control circuit and relay in the standby mode, the electronic device 200 of the embodiment of the invention can effectively reduce the required power for loading devices in the standby mode by using only the signal sensor 221 for receiving the system power-on signal. Therefore, the electronic device 200 of the invention has a standby power consumption, that is, the power consumption of the signal sensor 221, equal to 5V×1.1 mA=5.5 mV, which is much lower than that of the conventional electronic device.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A standby power supply system, applied to an electronic device, the electronic device comprising an operation power supply and a power load, the standby power supply system comprising:
   a signal sensor, for receiving a system power-on signal inputted by a user, and accordingly generating a charging signal and a power actuation signal;
   a standby power source, coupled to the signal sensor for supplying power to the signal sensor;
   a switch circuit, coupled to the standby power source and the signal sensor for receiving the charging signal and accordingly turning on the switch circuit for a period of preset charge time;
   a charging circuit, coupled to the switch circuit, wherein when the switch circuit is turned on, the standby power source charges the charging circuit; and
   a power control unit, coupled to the charging circuit and the signal sensor, wherein when the charging circuit is charged to a preset voltage, the charging circuit actuates the power control unit to receive the power actuation signal and accordingly actuate the operation power supply such that the operation power supply can supply an operational voltage to the power load;
   wherein the preset charge time is at least enough for the standby power source to charge the charging circuit to the preset voltage.

2. The standby power supply system according to claim 1, wherein the switch circuit comprises a PNP-type bipolar junction transistor (BJT), the charging signal has a low voltage level, and the PNP-type BJT is turned on according to the low voltage level of the charging signal.

3. The standby power supply system according to claim 2, wherein the power actuation signal includes a high voltage level and a digital encoded signal in sequence, and the PNP-type BJT is turned off according to the high voltage level of the power actuation signal.

4. The standby power supply system according to claim 1, wherein after the operation power supply supplies the operational voltage, the operation power supply supplies power to the signal sensor instead of the standby power source.

5. The standby power supply system according to claim 1, wherein after the operation power supply supplies the operational voltage, the operation power supply supplies power to the power control unit instead of the charging circuit.

6. An electronic device with standby function, comprising:
   a power load;
   a operation power supply, coupled to the power load; and
   a standby power supply system, comprising:
      a signal sensor, for receiving a system power-on signal inputted by a user, and accordingly generating a charging signal and a power actuation signal;
      a standby power source, coupled to the signal sensor for supplying power to the signal sensor;
      a switch circuit, coupled to the standby power source and the signal sensor for receiving the charging signal and accordingly turning on the switch circuit for a period of preset charge time;
      a charging circuit, coupled to the switch circuit, wherein when the switch circuit is turned on, the standby power source charges the charging circuit; and
      a power control unit, coupled to the charging circuit and the signal sensor, wherein when the charging circuit is charged to a preset voltage, the charging circuit actuates the power control unit to receive the power actuation signal and accordingly actuate the operation power supply such that the operation power supply can supply an operational voltage to the power load;
   wherein the preset charge time is at least enough for the standby power source to charge the charging circuit to the preset voltage.

7. The electronic device according to claim 6, wherein the switch circuit comprises a PNP-type BJT, the charging signal has a low voltage level, and the PNP-type BJT is turned on according to the low voltage level of the charging signal.

8. The electronic device according to claim 7, wherein the power actuation signal includes a high voltage level and a digital encoded signal in sequence, and the PNP-type BJT is turned off according to the high voltage level of the power actuation signal.

9. The electronic device according to claim 6, wherein after the operation power supply supplies the operational voltage, the operation power supply supplies power to the signal sensor instead of the standby power source.

10. The electronic device according to claim 6, wherein after the operation power supply supplies the operational voltage, the operation power supply supplies power to the power control unit instead of the charging circuit.

11. A method for supplying power to actuate an electronic device, the electronic device comprising a signal sensor, a standby power source, a switch circuit coupled to the standby power source and the signal sensor, a charging circuit coupled to the switch circuit, a power control unit coupled to the charging circuit and the signal sensor, a operation power supply and a power load, the method comprising:
   receiving a system power-on signal inputted by a user by using the signal sensor and accordingly generating a charging signal and a power actuation signal;
   receiving the charging signal by using the switch circuit and accordingly turning on the switch circuit for a period of preset charge time such that the standby power source can charge the charging circuit;
   when the charging circuit is charged to a preset voltage, actuating the power control unit by using the charging circuit; and
   receiving the power actuation signal by using the power control unit and accordingly actuating the operation power supply such that the operation power supply can supply an operational voltage to the power load;

wherein the preset charge time is at least enough for the standby power source to charge the charging circuit to the preset voltage.

12. The method according to claim 11, further comprising after the operation power supply supplies the operational voltage, supplying power to the signal sensor by using the operation power supply instead of the standby power source.

13. The method according to claim 11, further comprising after the operation power supply supplies the operational voltage, supplying power to the power control unit by using the operation power supply instead of the charging circuit.

* * * * *